United States Patent
Davies (10) Patent No.: US 11,506,082 B2
(45) Date of Patent: Nov. 22, 2022

(54) OIL SCAVENGE SYSTEM (71) Applicant: ROLLS-ROYCE plc, London (GB)

(72) Inventor: Neil J Davies, Derby (GB)

(73) Assignee: ROLLS-ROYCE PLC, London (GB)

( * ) Notice: Subject to any disclaimer, the term of this patent is extended or adjusted under 35 U.S.C. 154(b) by 366 days.

(21) Appl. No.: 16/742,022

(22) Filed: Jan. 14, 2020

(65) Prior Publication Data

US 2020/0232343 A1    Jul. 23, 2020

(30) Foreign Application Priority Data

Jan. 23, 2019 (GB) .................................... 1900906

(51) Int. Cl.
*F01D 25/20* (2006.01)
*F16N 7/40* (2006.01)

(52) U.S. Cl.
CPC .............. *F01D 25/20* (2013.01); *F16N 7/40* (2013.01); *F05D 2260/98* (2013.01); *F16N 2210/02* (2013.01)

(58) Field of Classification Search
CPC ........ F01D 25/20; F16N 7/40; F16N 2210/02; F05D 2260/98
See application file for complete search history.

(56) References Cited

U.S. PATENT DOCUMENTS

| 3,168,236 A | 2/1965 | Lamberton et al. |
| 3,486,582 A | 12/1969 | Carter et al. |
| 5,121,599 A * | 6/1992 | Snyder ............. F16N 39/06 60/39.08 |
| 9,849,411 B2 | 12/2017 | Sheridan |
| 2009/0101444 A1 | 4/2009 | Alecu |

(Continued)

FOREIGN PATENT DOCUMENTS

| CN | 104981591 A | 10/2015 |
| CN | 205424389 U | 8/2016 |

(Continued)

OTHER PUBLICATIONS

May 19, 2020 extended Search Report issued in European Patent Application No. 19219318.3.

(Continued)

*Primary Examiner* — Michael R Mansen
*Assistant Examiner* — Mark K Buse
(74) *Attorney, Agent, or Firm* — Oliff PLC (57) ABSTRACT

An oil scavenge system for a gas turbine engine comprising an oil tank and at least one bearing chamber. The oil scavenge system comprises at least one primary scavenge pump, a manifold, a secondary scavenge pump, a deaerator and a filter unit. The at least one primary scavenge pump is configured to pump oil from the at least one bearing chamber to the manifold whilst raising the pressure of the oil from a starting pressure to a first pressure elevated with respect to the starting pressure. The manifold is pressurised to substantially maintain the oil at said first pressure. The secondary scavenge pump is configured to pump oil from the manifold at the first pressure and to raise the pressure of the oil to a second pressure elevated with respect to the first pressure before pumping the oil to the deaerator and through the filter unit to the oil tank.

14 Claims, 5 Drawing Sheets

(56) References Cited

U.S. PATENT DOCUMENTS

| | | | |
|---|---|---|---|
| 2009/0235632 A1* | 9/2009 | Pisseloup | F16N 7/40 60/39.08 |
| 2011/0023444 A1* | 2/2011 | Veilleux, Jr. | F02C 7/222 60/734 |
| 2011/0314830 A1* | 12/2011 | Legare | F01D 25/20 60/39.08 |
| 2014/0033922 A1 | 2/2014 | Peck et al. | |
| 2015/0343346 A1 | 12/2015 | Sheridan | |
| 2017/0101935 A1* | 4/2017 | Waissi | F02C 7/236 |
| 2018/0306062 A1* | 10/2018 | Avis | F01M 1/02 |
| 2020/0200043 A1* | 6/2020 | Parnin | F01M 11/067 |
| 2020/0232343 A1* | 7/2020 | Davies | F16N 39/06 |
| 2021/0197980 A1* | 7/2021 | Blewett | B01D 19/0052 |
| 2021/0324798 A1* | 10/2021 | Fujii | F01D 25/20 |

FOREIGN PATENT DOCUMENTS

| | | |
|---|---|---|
| CN | 106661962 A | 5/2017 |
| EP | 2949884 A1 | 12/2015 |

OTHER PUBLICATIONS

Search Report of the Intellectual Property Office of the United Kingdom for GB1900906.7 with search dated Jul. 23, 2019.
Aug. 1, 2022 Office Action issued in Chinese Patent Application No. 202010076658.6.

* cited by examiner

OIL SCAVENGE SYSTEM

CROSS-REFERENCE TO RELATED APPLICATIONS

This specification is based upon and claims the benefit of priority from United Kingdom patent application number GB 1900906.7 filed on Jan. 23, 2019, the entire contents of which are incorporated herein by reference.

BACKGROUND

Field of the Disclosure

The present disclosure relates to an oil scavenge system for a gas turbine engine, a method of scavenging oil and a gas turbine engine.

Description of the Related Art

Gas turbine engines are typically full flow recirculatory systems requiring adequate lubrication and cooling of all engine bearings, gears and drive splines under all foreseeable operating conditions.

Lubricant scavenge systems, more specifically oil scavenge systems (such as an oil scavenge pump), in gas turbine engines remove lubricant from a sump area within the engine adjacent engine components (typically bearings) which require constant lubrication during engine operation.

Traditionally oil filtering systems for a gas turbine engine are located on the discharge side of the oil feed pump, or the discharge side of the oil scavenge pumps prior to returning the oil to the oil tank However, for some gas turbine engines (for example, gas turbine engines with core mounted accessories and/or a fan case mounted oil tank), the ability to install the required oil filtering system on the discharge side of the oil feed pump can cause issues with regard to the space available to install the filter. However, alternatively trying to install an oil filtering system on the inlet side of an oil feed pump (e.g., between the oil tank and pump inlet) further reduces the inlet pressure of the oil feed pump, which is undesirable, as this may result in pump cavitation and damage.

Installing the filter system on the discharge side of the scavenge pump may allow the filter system to be installed on the fan case near the oil tank. However, if this configuration is adopted for an engine with very low bearing chamber pressure (e.g., pressures as low as ambient), this requires an oil scavenge pump to provide a high outlet pressure from a very low inlet pressure, requiring a high pressure rise across the oil scavenge pump. Such high pressure rises are a significant factor in oil pump cavitation, which can result in wear of and damage to the oil scavenge pump.

SUMMARY

According to a first aspect there is provided an oil scavenge system for a gas turbine engine comprising an oil tank and at least one bearing chamber, the system comprising: at least one primary scavenge pump, a manifold, a secondary scavenge pump, a deaerator and a filter unit; the at least one primary scavenge pump configured to pump oil from the at least one bearing chamber to the manifold whilst raising the pressure of the oil to a first elevated pressure; wherein the manifold is pressurised to substantially maintain the oil at said first elevated pressure; and wherein the secondary scavenge pump is configured to pump oil from the manifold at the first elevated pressure and raise the pressure of the oil to a second elevated pressure before pumping the oil to the deaerator and through the filter unit to the oil tank.

In gas turbine engines, such as those with core mounted accessories, the oil filtering system is best installed in the oil scavenge line (as opposed to being installed on the discharge side of an oil feed pump). This is because in such gas turbine engines, the oil filtering system is preferably mounted on the oil tank (which is mounted on the fan case of the gas turbine engine as it is generally cooler than most other parts of the gas turbine engine). However, conventionally, installing an oil filtering system on the inlet side of an oil feed pump reduces the inlet pressure of the oil feed pump.

By contrast, providing a two-stage oil scavenge system in accordance with the first aspect, using the at least one primary scavenge pump and the secondary scavenge pump, may provide an oil scavenge system that provides a high outlet pressure from a low inlet pressure, whilst preventing cavitation in either or both of the at least one primary scavenge pump and the secondary scavenge pump (where cavitation may be caused by low inlet pressures and high outlet pressures).

A two-stage oil scavenge system in accordance with the first aspect may also enable high pressure drop devices (for example, a deaerator or a filter unit) to be incorporated into an oil scavenge line of an oil system of a gas turbine engine without causing significant cavitation damage to either or both of the at least one primary scavenge pump and the secondary scavenge pump. The high pressure drop devices may be installed in a part of the oil system not directly in fluid communication with the at least one primary scavenge pump.

The secondary scavenge pump may comprise a single pump unit. The single pump unit of the secondary scavenge pump may comprise a large capacity pump unit. The single pump unit may have a capacity of between from $5 \times 10^{-5}$ $m^3 s^{-1}$ to $2.5 \times 10^{-3}$ $m^3 s^{-1}$ (between from 40 to 2000 Imperial Gallons per Hour). Alternatively, the secondary scavenge pump may comprise a plurality of pump units. Each of the plurality of pump units may comprise a small capacity pump unit. Each of the plurality of pump units may have a capacity of between from 20% to 80% of the capacity of an equivalent large capacity pump unit, e.g., between from $1 \times 10^{-5}$ $m^3 s^{-1}$ to $2 \times 10^{-3}$ $m^3 s^{-1}$ (between from 8 to 1600 Imperial Gallons per Hour).

Each unit of the plurality of pump units of the secondary scavenge pump may be driven individually. Alternatively, each unit of the plurality of pump units may be driven in any combination with one or more of the other pump units of the plurality of pump units.

The first elevated pressure may be between from 103 $kN/m^2$ to 483 $kN/m^2$ (between from 10 psi to 70 psi) and the second elevated pressure may be between from 379 $kN/m^2$ to 586 $kN/m^2$ (between from 55 psi to 85 psi), the second elevated pressure being greater than the first elevated pressure.

Each of the at least one primary scavenge pump and the secondary scavenge pump may contribute an oil pressure increase of between from 20% to 80% of the pressure difference between a pressure in the at least one bearing chamber and the second elevated pressure.

The deaerator may be a high pressure drop deaerator. A pressure drop of between from 34 $kN/m^2$ to 207 $kN/m^2$ (between from 5 psi to 30 psi) may take place through the deaerator. The filter unit may be a high pressure drop filter unit. A pressure drop of between from 34 kN/m² to 207 kN/m² (between from 5 psi to 30 psi) may take place through the filter unit.

According to a second aspect there is provided a gas turbine engine including an oil scavenge system of the first aspect.

The gas turbine engine may be an aircraft gas turbine engine.

According to a third aspect there is provided an aircraft comprising a gas turbine engine according to the second aspect.

According to a fourth aspect there is provided a method of scavenging oil in a gas turbine engine, the method comprising the steps of: pumping oil from at least one bearing chamber to a manifold using at least one primary scavenge pump that raises the pressure of the oil to a first elevated pressure; pumping the oil from the manifold to a deaerator using a secondary scavenge pump that raises the pressure of the oil to a second elevated pressure; and discharging the pressurised oil to an oil tank via a filter unit.

Scavenging oil using a two-stage scavenging method in accordance with the fourth aspect, using the at least one primary scavenge pump and the secondary scavenge pump, may enable the oil scavenge system to provide a high outlet pressure from a low inlet pressure, whilst preventing cavitation in either or both of the at least one primary scavenge pump and the secondary scavenge pump (where cavitation may be caused by low inlet pressures and high outlet pressures).

A two-stage oil scavenging method in accordance with the fourth aspect may also enable high pressure drop devices (for example, a deaerator or a filter unit) to be incorporated into an oil scavenge line of an oil system of a gas turbine engine without causing significant cavitation damage to either or both of the at least one primary scavenge pump and the secondary scavenge pump. The high pressure drop devices may be installed in a part of the oil system not directly in fluid communication with the at least one primary scavenge pump.

The secondary scavenge pump may comprise a single pump unit. The single pump unit of the secondary scavenge pump may comprise a large capacity pump unit. The single pump unit may have a capacity of between from $5 \times 10^{-5}$ m³s⁻¹ to $2.5 \times 10^{-3}$ m³s⁻¹ (between from 40 to 2000 Imperial Gallons per Hour). Alternatively, the secondary scavenge pump may comprise a plurality of pump units. Each of the plurality of pump units may comprise a small capacity pump unit. Each of the plurality of pump units may have a capacity of between from 20% to 80% of the capacity of an equivalent large capacity pump unit, e.g., between from $1 \times 10^{-5}$ m³s⁻¹ to $2 \times 10^{-3}$ m³s⁻¹ (between from 8 to 1600 Imperial Gallons per Hour).

Each unit of the plurality of pump units of the secondary scavenge pump may be driven individually. Alternatively, each unit of the plurality of pump units may be driven in any combination with one or more of the other pump units of the plurality of pump units.

The first elevated pressure may be between from 103 kN/m² to 483 kN/m² (between from 10 psi to 70 psi). The second elevated pressure may be between from 379 kN/m² to 586 kN/m² (between from 55 psi to 85 psi).

The deaerator may be a high pressure drop deaerator. A pressure drop of between from 34 kN/m² to 207 kN/m² (between from 5 psi to 30 psi) may take place through the deaerator. The filter unit may be a high pressure drop filter unit. A pressure drop of between from 34 kN/m² to 207 kN/m² (between from 5 psi to 30 psi) may take place through the filter unit.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 230 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 18506K, 19006K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
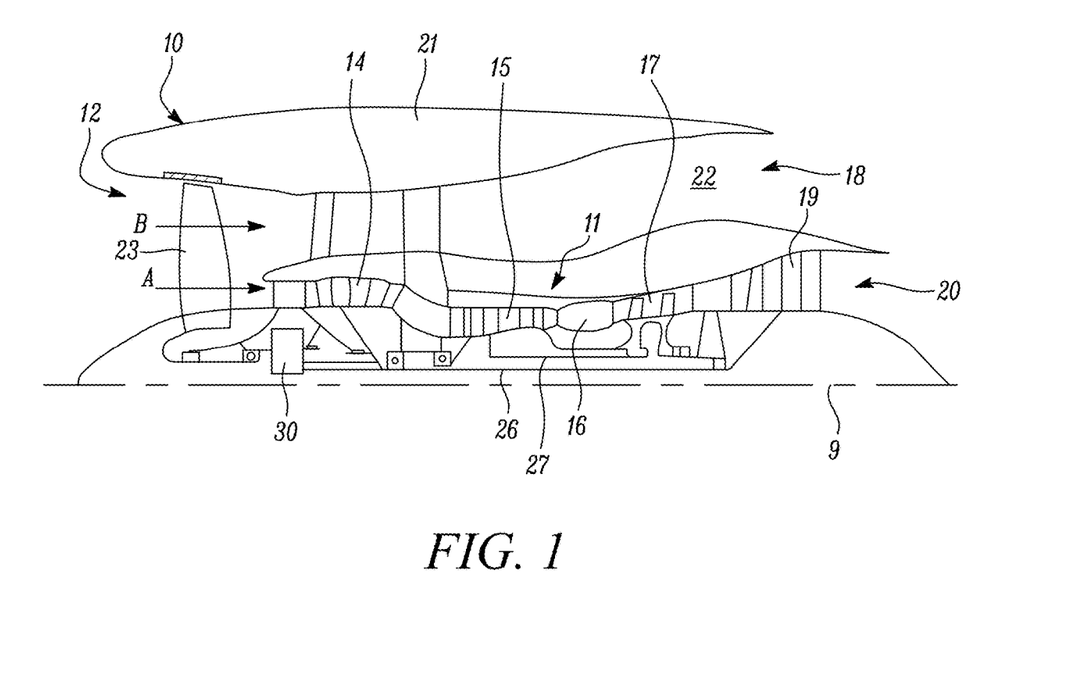
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
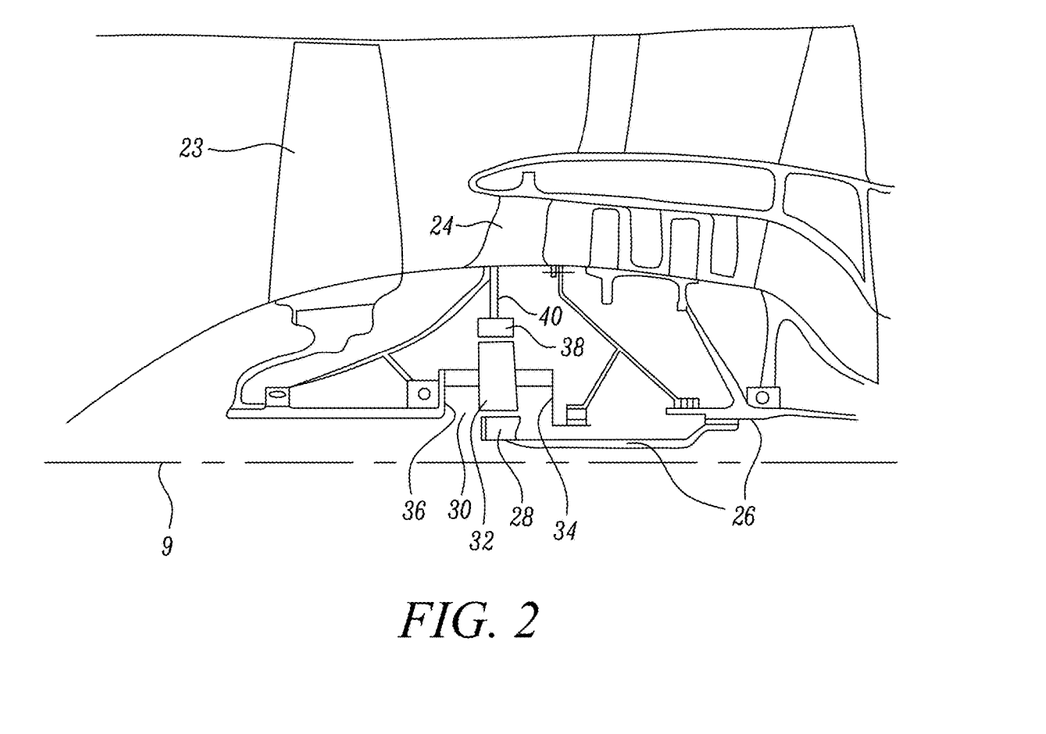
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
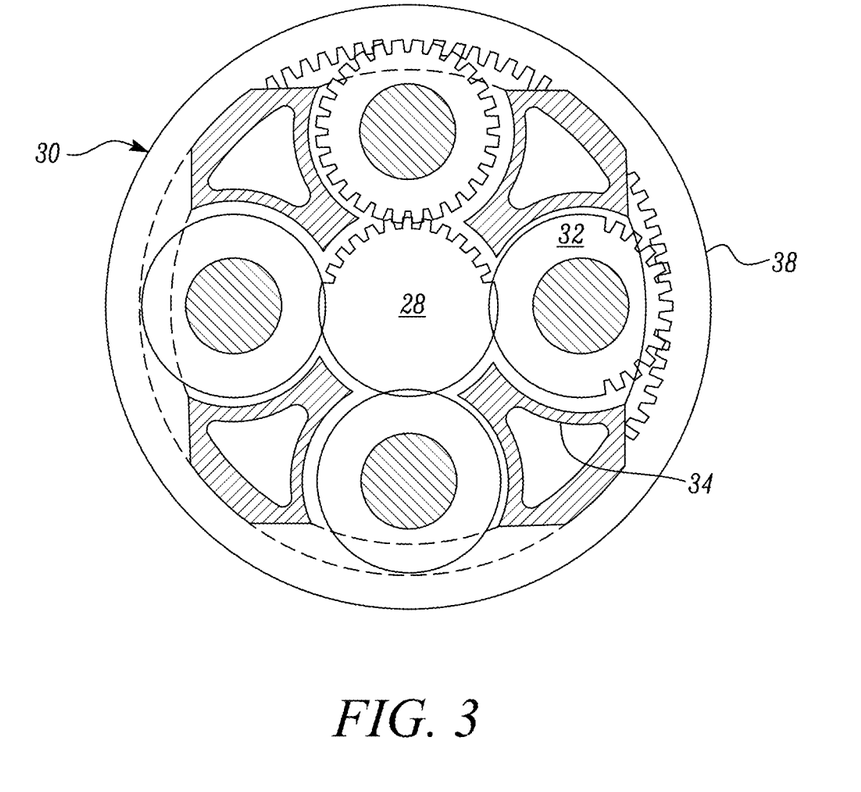
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
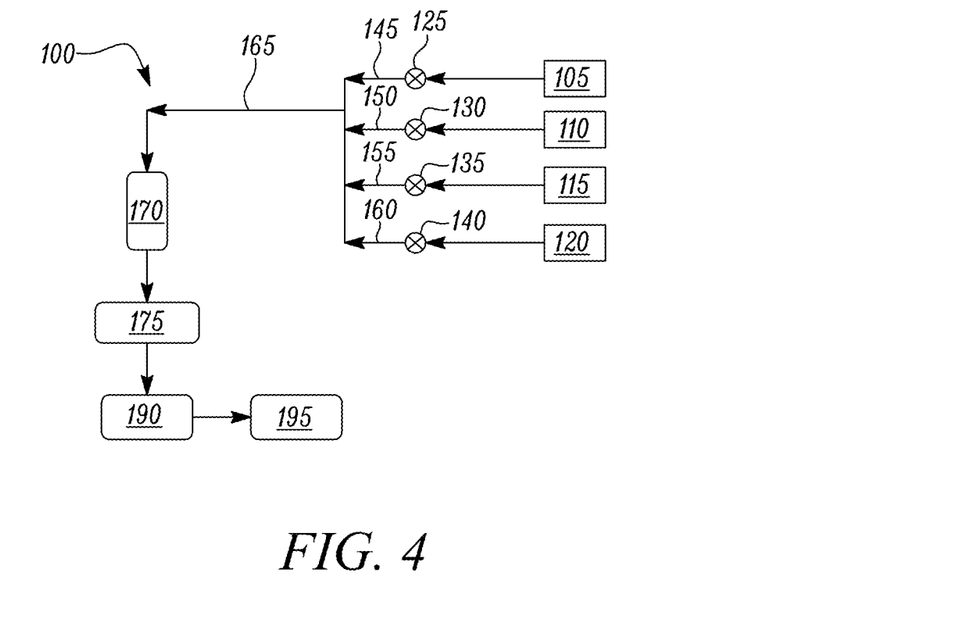
FIG. 4 shows a conventional arrangement of an oil system for a gas turbine engine.

FIG. 4 shows a conventional arrangement of an oil scavenge system 100 for a gas turbine engine such as the gas turbine engine described with respect to FIGS. 1 to 3, the oil scavenge system 100 comprising bearing chambers 105, 110, 115, 120, and a deaerator 170 and a filter unit 175 installed in a main oil scavenge line 165 of the oil scavenge system 100, i.e., on an inlet side of an oil feed pump 195. Each of the bearing chambers 105, 110, 115, 120 is a low pressure bearing chamber. Oil is scavenged from each of the low pressure bearing chambers 105, 110, 115, 120 by a respective scavenge pump 125, 130, 135, 140. Each of the scavenge pumps 125, 130, 135, 140 raises the pressure of the oil scavenged from the respective bearing chamber 105, 110, 115, 120 from a low pressure to a high pressure. Oil scavenged by each of the scavenge pumps 125, 130, 135, 140 is output to an oil scavenge line 145, 150, 155, 160 connected to the respective scavenge pump 125, 130, 135, 140. Downstream of the scavenge pumps 125, 130, 135, 140, the oil scavenge lines 145, 150, 155, 160 each feed in to the main oil scavenge line 165. Oil from each of the oil scavenge lines 145, 150, 155, 160 is therefore directed to the main oil scavenge line 165. Oil in the main oil scavenge line 165 is directed to and passed through a deaerator 170. Oil output from the deaerator 170 is then directed to and passed through a filter unit 175. Oil output from the filter unit 175 is discharged to an oil tank 190.

In the conventional arrangement shown in FIG. 4, the scavenge pumps 125, 130, 135, 140 of the oil scavenge system 100 are required to produce high outlet pressures to account for a high pressure drop across the deaerator 170 and the filter unit 175. However, the bearing chambers 105, 110, 115, 120 are low pressure bearing chambers, so the inlet pressure of the scavenge pumps 125, 130, 135, 140 is low. Providing a high outlet pressure from the scavenge pumps 125, 130, 135, 140 using a low input pressure provided to the scavenge pumps 125, 130, 135, 140 can cause significant cavitation damage in the scavenge pumps 125, 103, 135, 140, resulting in short scavenge pump life.

Figure 5:
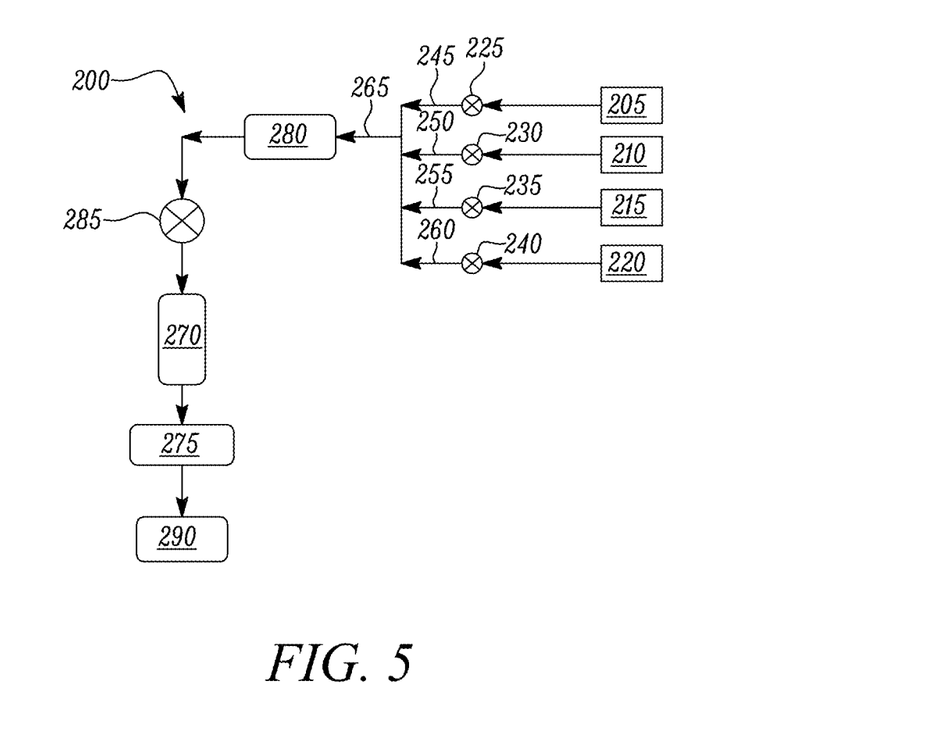
FIG. 5 shows an arrangement of an oil system for a gas turbine engine for an embodiment in accordance with the disclosure.

FIG. 5 shows an oil scavenge system 200 for a gas turbine engine in accordance with an embodiment of the disclosure. The oil scavenge system 200 comprises bearing chambers 205, 210, 215, 220. Each of the bearing chambers 205, 210, 215, 220 is a low pressure bearing chamber. Oil is scavenged from each of the low pressure bearing chambers 205, 210, 215, 220 by a respective primary scavenge pump 225, 230, 235, 240. Each of the primary scavenge pumps 225, 230, 235, 240 raises the pressure of the oil scavenged from the respective bearing chamber 205, 210, 215, 220 from a low pressure to a first elevated pressure (a medium pressure). The first elevated pressure or medium pressure is an intermediate pressure between the low pressure of the oil in the bearing chambers 205, 210, 215, 220 and the pressure of the oil required to account for a pressure drop across components located downstream of the primary scavenge pumps 225, 230, 235, 240.

Oil scavenged by each of the primary scavenge pumps 225, 230, 235, 240 is output to an oil scavenge line 245, 250, 255, 260 connected to the respective primary scavenge pump 225, 230, 235, 240. Downstream of the primary scavenge pumps 225, 230, 235, 240, the oil scavenge lines 245, 250, 255, 260 each feed in to a main oil scavenge line 265. Oil from each of the oil scavenge lines 245, 250, 255, 260 is therefore directed to the main oil scavenge line 265.

Oil in the main oil scavenge line 265 is then directed to a manifold 280. The manifold 280 is pressurised to substantially maintain the oil in the manifold 280 at the first elevated pressure or medium pressure.

Oil from the manifold 280 is directed to a secondary scavenge pump 285. The secondary scavenge pump 285 raises the pressure of the oil from the manifold 280 from the first elevated pressure or medium pressure to a second elevated pressure (a high pressure). The second elevated pressure or high pressure is a pressure high enough to account for a pressure drop across components located downstream of the secondary scavenge pump 285. Oil output from the secondary scavenge pump 285 is directed to and passed through a deaerator 270. Oil output from the deaerator 270 is directed to and passed through a filter unit 275. Oil output from the filter unit 275 is discharged to an oil tank (290).

In this way, the primary scavenge pumps 225, 230, 235, 240 are not required to raise the pressure of the oil from the bearing chambers 205, 210, 215, 220 to a pressure high enough to fully account for a pressure drop across components (i.e., deaerator 270, filter unit 275) of the oil system 200 located downstream of the primary scavenge pumps 225, 230, 235, 240. By utilising the pressurised manifold 280 to maintain the oil collected from the bearing chambers 205, 210, 215, 220 by the primary scavenge pumps 225, 230, 235, 240 at the first elevated pressure, provided by the primary scavenge pumps 225, 230, 235, 240, the pressure difference required between the inlet pressure and the outlet pressure of the primary scavenge pumps 225, 230, 235, 240 is reduced. The remaining increase in the pressure of the oil required to account for the pressure drop across the deaerator 270 and the filter unit 275 is provided by the secondary scavenge pump 285.

Therefore, the risk of cavitation damage to both the primary scavenge pumps 225, 230, 235, 240 and the secondary scavenge pump 285 is greatly reduced, whilst still providing an efficient and robust oil scavenge system 200 which can provide a high outlet pressure from a low inlet pressure. The oil scavenge system 200 also enables effective deaeration and filtering of the oil in the main oil scavenge line 265 whilst reducing the risk of cavitation damage to both the primary scavenge pumps 225, 230, 235, 240 and the secondary scavenge pump 285.

In the above described embodiment, the secondary scavenge pump 285 comprises a single unit. The secondary scavenge pump 285 may have a capacity of between from $5 \times 10^{-5}$ m$^3$s$^{-1}$ to $2.5 \times 10^{-3}$ m$^3$s$^{-1}$ (between from 40 to 2000 Imperial Gallons per Hour). In alternative embodiments, the secondary scavenge pump 285 may comprise a plurality of units. In some embodiments, each unit of the plurality of units of the secondary scavenge pump 285 may be driven individually. In other embodiments, each unit of the plurality of units of the secondary scavenge pump 285 may be driven in any combination with one or more of the other units of the plurality of units of the secondary scavenge pump 285.

In the above described embodiment, the gas turbine engine comprises a plurality of bearing chambers 205, 210, 215, 220. The oil scavenge system 200 comprises an equivalent plurality of primary scavenge pumps 225, 230, 235, 240. In alternative embodiments, the gas turbine engine may comprise a single bearing chamber, and may only comprise a single primary scavenge pump. In other embodiments, the number of bearing chambers may not be equal to the number of primary scavenge pumps. For example, the oil scavenge system may comprise a greater or lesser number of primary scavenge pumps than the number of bearing chambers in the gas turbine engine. Each of the primary scavenge pumps may have the same pump capacity or may have a different capacity, depending on the particular bearing chamber that the each of the primary scavenge pumps scavenges oil from. Each primary scavenge pump must have a capacity large enough to meet the flow rate of oil through the bearing chamber it scavenges oil from. The sum of the capacities of the primary scavenge pumps (or if only one primary scavenge pump is present, the capacity of the primary scavenge pump) is approximately equal to the sum of the capacities of the plurality of pump units of the secondary scavenge pump 285 (or if the secondary scavenge pump 285 only comprises a single unit, the capacity of the single unit of the secondary scavenge pump 285).

In the above described embodiment, each of the primary scavenge pumps 225, 230, 235, 240 is one of a gear pump, a vane pump and a georotor pump. In alternative embodiments, one or more of the primary scavenge pumps 225, 230, 235, 240 may be one of a piston pump and a centrifugal pump.

In the above described embodiment, the secondary scavenge pump 285 is one of a gear pump, a vane pump and a georotor pump. In alternative embodiments, the secondary scavenge pump may be one of a piston pump and a centrifugal pump.

Figure 6:
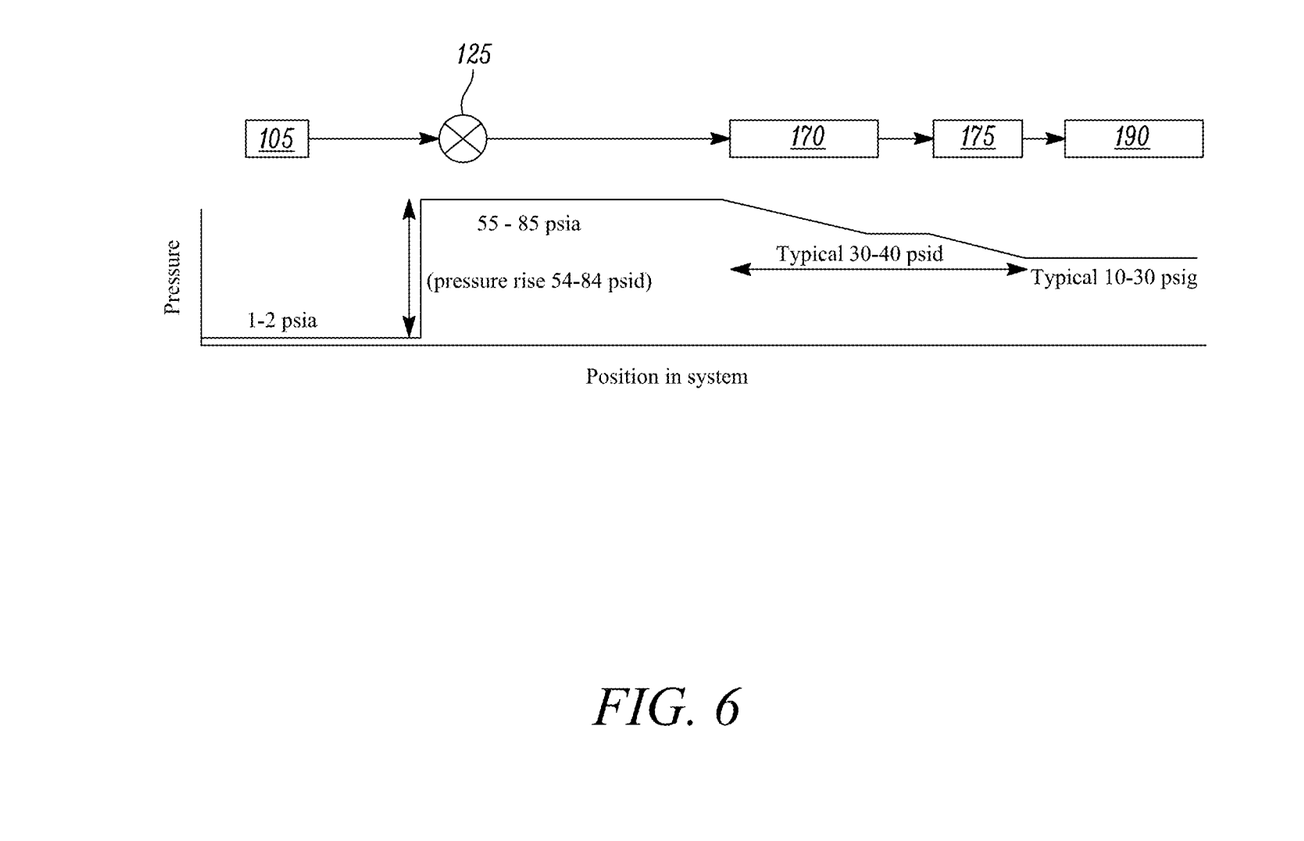
FIG. 6 shows a schematic of pressure variation through a conventional oil system for a gas turbine engine.

FIG. 6 shows an example schematic of pressure variation through various components of the conventionally arranged oil scavenge system shown in FIG. 4.

The low pressure bearing chamber 105 may have a low absolute pressure of between approximately 6.895 kN/m$^2$ and 13.790 kN/m$^2$ (between 1 psia and 2 psia, where psia is an absolute pressure in psi). The scavenge pump 125 may increase the pressure of oil scavenged from the bearing chamber 105 to between approximately 379 kN/m$^2$ and 586 kN/m$^2$ (between 55 psia and 85 psia), giving a pressure rise of between approximately 372 kN/m$^2$ and 579 kN/m$^2$ (between 54 psid and 84 psid, where psid is a differential pressure, e.g., the difference in pressure between the low pressure of the bearing chamber and the increased pressure of the oil after passing through the scavenge pump, in psi) across the scavenge pump 125. A high pressure rise from a low inlet pressure such as the pressure rise performed by the scavenge pump 125 to raise the pressure of the oil scavenged from the bearing chamber 105 may result in damage to the scavenge pump 125, for example cavitation damage.

The oil pressurised by the scavenge pump 125 is then passed through the deaerator 170 and subsequently passed through the filter unit 175. The pressurised oil may experience a total reduction in pressure of between approximately 207 kN/m$^2$ and 276 kN/m$^2$ (between 30 psid and 40 psid) across the deaerator 170 and the filter unit 175. The deaerated and filtered oil is then directed to the oil tank 190, where the oil may have a pressure of between approximately 172 kN/m$^2$ and 310 kN/m$^2$ (between 10 psig and 30 psig, where psig is a pressure relative to atmospheric pressure, in psi).

Figure 7:
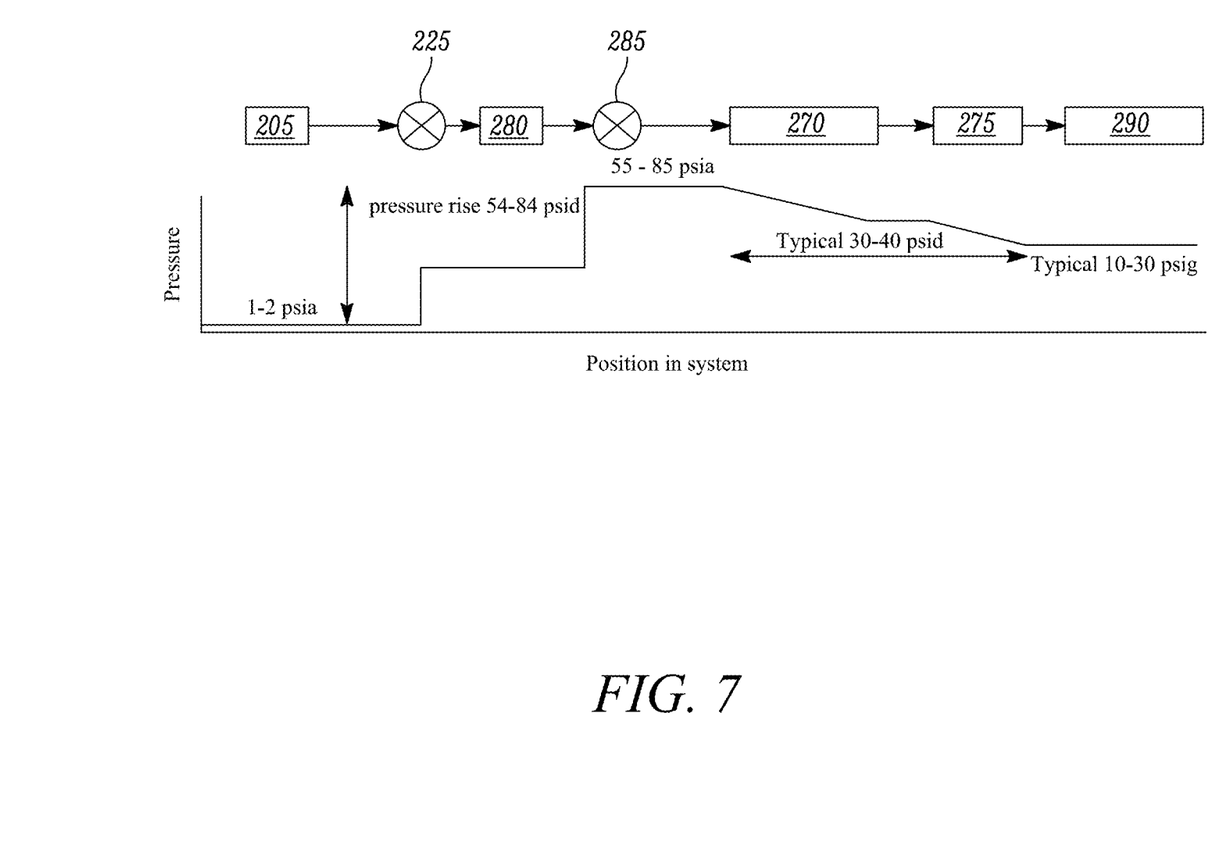
FIG. 7 shows a schematic of pressure variation through an oil system for a gas turbine in accordance with the disclosure.

FIG. 7 shows an example schematic of pressure variation through various components of the arrangement of the oil scavenge system in accordance with an embodiment of the disclosure, as shown in FIG. 5. It should be noted that the pressure values indicated are merely exemplary and are used to illustrate the concept behind the two-stage oil scavenging system of the disclosure.

The low pressure bearing chamber 205 may have a low absolute pressure of between approximately 6.895 kN/m$^2$ and 13.790 kN/m$^2$ (between 1 psia and 2 psia). The scavenge pump 225 increases the pressure of oil scavenged from the bearing chamber 205 to the first elevated pressure, and directs the scavenged oil to the pressurised manifold 280. The secondary scavenge pump 285 subsequently increases the pressure of oil in the manifold 280 to the second elevated pressure. The second elevated pressure may be between 379 kN/m$^2$ and 586 kN/m$^2$ (between 55 psia and 85 psia), giving a total pressure rise of between approximately 372 kN/m$^2$ and 579 kN/m$^2$ (between 54 psid and 84 psid) spread across both the primary scavenge pump 225 and the secondary scavenge pump 285.

Each of the primary scavenge pump 225 and the secondary scavenge pump 285 may contribute a proportion of the total pressure rise. For example, each of the primary scavenge pump 225 and the secondary scavenge pump 285 may contribute between from approximately 20% to approximately 80% of the total pressure rise required across the two scavenge pump stages. If the total pressure increase required across the two scavenge pump stages is between 379 kN/m$^2$ and 586 kN/m$^2$ (between 54 psi and 84 psi), each of the primary scavenge pump 225 and the secondary scavenge pump 285 may therefore provide a pressure rise of between from 69 kN/m$^2$ to 483 kN/m$^2$ (between from 10 psi to 70 psi). The primary scavenge pump 225 may provide an outgoing pressure of between 10 times and 70 times the incoming pressure delivered to the primary scavenge pump 225.

The contribution of each of the primary scavenge pump 225 and the secondary scavenge pump 285 to the total pressure rise may be modified depending on the operating conditions of the oil scavenge system 200. For example, the pressure rise across, and pump capacity of, each of the primary scavenge pump 225 and the secondary scavenge pump 285 may be modified in real time during operating to account for changes in operating conditions. Each of the primary scavenge pump 225 and the secondary scavenge pump 285 may comprise a controllable variable speed drive to enable modification of the pump capacity and pressure rise across the pumps during operation. The effect of this is to ensure that the first elevated pressure allows the primary scavenge pump 225 to operate safely (e.g., without risk of cavitation damage) using the low inlet pressure of oil in the bearing chamber 205, whilst ensuring that the capacity of the secondary scavenge pump 285 is not large enough to reduce the pressure in the manifold 280 (i.e., the first elevated pressure) to a pressure below an acceptable level. If the pressure in the manifold 280 is reduced too much, the secondary scavenge pump 285 may also be at risk of damage due to cavitation caused by an excessive pressure rise across the secondary scavenge pump 285. The operational relationship between the primary scavenge pump 225 and the secondary scavenge pump 285 may be fixed, in which case changes in speed (and therefore pump capacity and pressure rise) of each of the primary scavenge pump 225 and the secondary scavenge pump 285 may be the same or in proportion to one another. Alternatively, speed of the primary scavenge pump 225 and speed of the secondary scavenge pump 285 may be varied independently of one another, allowing different capacity splits between the primary scavenge pump 225 and the secondary scavenge pump 285.

The oil pressurised by the primary scavenge pump 225 and the secondary scavenge pump 285 is then passed through the deaerator 270 and subsequently passed through the filter unit 275. The pressurised oil may experience a total reduction in pressure of between approximately 207 kN/m$^2$ and 276 kN/m$^2$ (between 30 psid and 40 psid) across the deaerator 270 and the filter unit 275. The deaerated and filtered oil is then directed to the oil tank 290, where the oil may have a pressure of between approximately 172 kN/m$^2$ and 310 kN/m$^2$ (between 10 psig and 30 psig).

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An oil scavenge system for a gas turbine engine having an oil tank and at least one bearing chamber, the oil scavenge system comprising:
    a manifold;
    at least one primary scavenge pump configured to pump oil from the at least one bearing chamber to the manifold while raising a pressure of the oil from a starting pressure to a first pressure, the manifold being pressurized to maintain the oil at the first pressure;
    a deaerator;
    a filter; and
    a secondary scavenge pump configured to:
        pump oil from the manifold at the first pressure and raise the pressure of the oil from the first pressure to a second pressure, and
        pump the oil, in flow series, from the manifold, through the deaerator and the filter, and into the oil tank.

2. The oil scavenge system of claim 1, wherein the secondary scavenge pump is a single pump unit.

3. The oil scavenge system of claim 1, wherein the secondary scavenge pump is a plurality of pump units.

4. The oil scavenge system of claim 3, wherein each of the plurality of pump units is driven individually.

5. The oil scavenge system of claim 3, wherein each of the plurality of pump units is driven in combination with one or more of the other pump units of the plurality of pump units.

6. The oil scavenge system of claim 1, wherein the first pressure is in a range from 103 kN/m2 to 483 kN/m2 (10 psi to 70 psi), and the second pressure is in a range from 55 psi to 85 psi, the second pressure being a greater pressure than the first pressure.

7. A gas turbine engine comprising:
    the oil scavenge system of claim 1;
    the oil tank; and
    the at least one bearing chamber.

8. An aircraft including the gas turbine engine of claim 7.

9. A method of scavenging oil in a gas turbine engine, the method comprising the steps of:
    pumping oil from at least one bearing chamber to a manifold using at least one primary scavenge pump configured to raise a pressure of the oil from a starting pressure to a first pressure;
    pumping the oil from the manifold to a deaerator using a secondary scavenge pump that raises the pressure of the oil from the first pressure to a second pressure; and
    discharging the pressurized oil from the deaerator to an oil tank via a filter.

10. The method of claim 9, wherein the secondary scavenge pump is a single pump unit.

11. The method of claim 9, wherein the secondary scavenge pump is a plurality of pump units.

12. The method of claim 11, wherein each of the plurality of pump units is driven individually.

13. The method of claim 11, wherein each of the plurality of pump units is driven in combination with one or more of the other pump units of the plurality of pump units.

14. The method of claim 9, wherein the first pressure is in a range from 103 kN/m2 to 483 kN/m2 (10 psi to 70 psi), and the second pressure is in a range from 379 kN/m2 to 586 kN/m2 (55 psi to 85 psi), the second pressure being a greater pressure than the first pressure.

* * * * *